Nov. 17, 1931.  DE LOSS K. MARTIN  1,831,921

SHORT WAVE RADIO ANTENNA SYSTEM

Filed May 24, 1927

INVENTOR.
D. K. Martin
BY
ATTORNEY

Patented Nov. 17, 1931

1,831,921

UNITED STATES PATENT OFFICE

DE LOSS K. MARTIN, OF WEST ORANGE, NEW JERSEY, ASSIGNOR TO AMERICAN TELEPHONE AND TELEGRAPH COMPANY, A CORPORATION OF NEW YORK

SHORT WAVE RADIO ANTENNA SYSTEM

Application filed May 24, 1927. Serial No. 193,892.

This invention relates to a short-wave radio antenna system, and particularly to means for determining the current at the midpoint of such a system and for connecting a plurality of such antennæ to a common terminating circuit.

In the operation of a short-wave antenna system, it is desirable to know the magnitude of the current at the midpoint of the system. In the past it has been customary to place a meter at that point, but since such antennæ are usually elevated well above the earth the reading of the meter has been difficult. In some instances a telescope has been employed.

One of the objects of this invention resides in a method by which the current strength at the midpoint of the short-wave antenna may be indicated at the station at which the signals are applied to the said antenna.

Another object of this invention consists in a method for terminating a plurality of antennæ, each of which is intended to operate upon a different wave length, the said method employing a terminating circuit which may be used with any of the antennæ without changing the effective length of the several antennæ.

Figure 1:
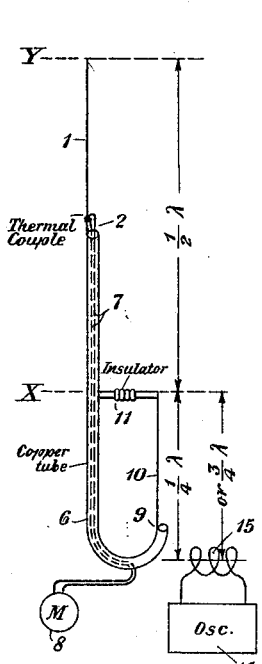
Figure 2:
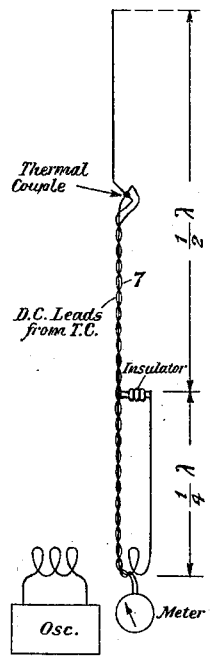
Figure 3:
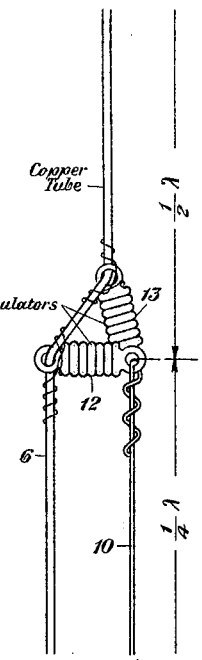
Figure 4:
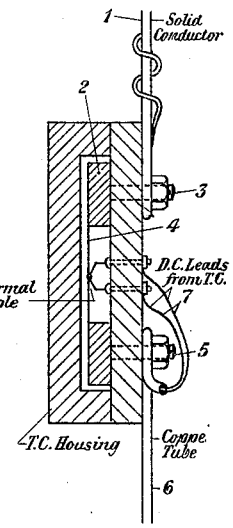
Figure 5:
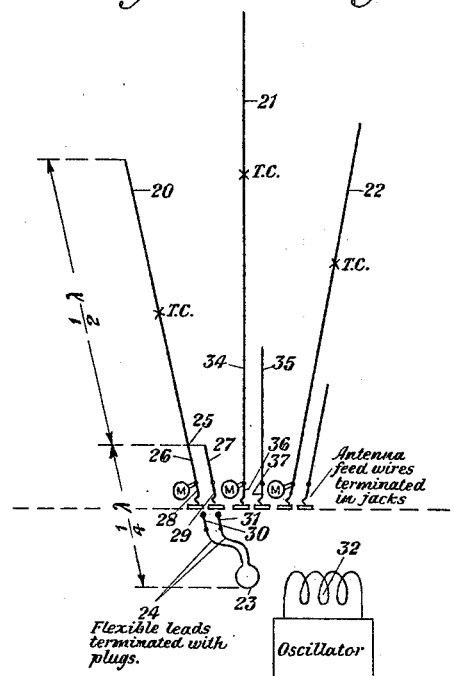
Figure 6:
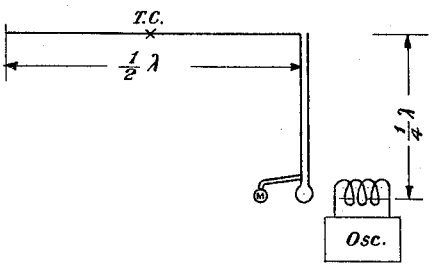

Other objects of this invention will be apparent from the following description when read in connection with the attached drawings of which Figure 1 shows schematically one form of embodiment of the invention; Fig. 2 shows another form which differs from that of Fig. 1 in the manner in which the direct current leads are brought to the meter upon which the antenna current is indicated; Fig. 3 is a detail of construction of the form of the invention shown in Fig. 1; Fig. 4 shows the mode of connection of a thermocouple with the antenna of Fig. 1; Fig. 5 shows schematically a system comprising three antennæ, each designed to operate upon a frequency differing from that of the other antennæ, all of which antennæ are arranged for connection with a common terminating circuit; and Fig. 6 shows a horizontal type of short-wave antenna.

In the arrangement shown in Fig. 1, the conductor 1 may be supported in any manner that will insure proper insulation to ground. For example, it may be supported from a horizontal conductor by means of suitable insulators. The lower end of the conductor 1 is connected with one side of the heating element of the thermocouple 2, which is shown in detail in Fig. 4. This thermocouple is a well known translating device that has been found very useful in measuring high frequency currents by converting them into equivalent direct current potentials. As will be seen in Fig. 4, the conductor 1 is connected with the lug 3, which in turn is metallically connected with the heating element 4 of the thermocouple. The other end of the heating element is connected with a lug 5, with which is connected a tube 6 of copper or other suitable material which, as will be pointed out later, serves as part of the short-wave antenna and also as part of the transmission circuit, by means of which high frequency oscillations are carried from the operating room of the station to the antenna. The tube 6 also serves to carry the direct current leads 7 from the direct current side of the thermocouple to the meter 8 (shown in Fig. 1) and at the same time to effectively shield these direct current leads from extraneous interference. The lower end of the tube 6 is bent in the form of a U and is connected at the point 9 with a conductor 10 that serves as part of the transmission circuit. In order to effectively support and to insulate the upper end of the conductor 10 from the tube 6 an insulating device 11 is inserted therebetween. A form of the device 11 is shown in detail in Fig. 3. As will be seen from this figure, two or more insulators 12 and 13 are fixedly connected with the tube 6 and the conductor 10 and serve to maintain the two sides of the transmission circuit well insulated from each other. In order that a clear idea of the nature of this invention may be obtained it is important to note that the transmission circuit embraces that portion of the copper tube extending from the point X to the point 9 and the conductor 10 that extends upward from the tube at the point 9. This U-shaped circuit constitutes a loop by virtue of the distributed capacity and distributed inductance along the circuit, and oscillations will be set up in this loop by an oscillator 14, which is coupled with the loop by means of the coupling inductance 15. The antenna extends from X to Y and includes that portion of the tube 6 between X and the thermocouple 2 and the conductor 1. It is important to point out that this antenna may be one-half wave length long or any multiple thereof, such as one and one-half, two and one-half wave lengths. It is also important to point out that the length of the transmission circuit shall be one-fourth wave length or any other odd quarter, such as three-quarters, five-quarters etc. In the form of antenna and transmission circuit shown in Fig. 1 a loop of voltage is obtained at the ends of the antenna and a node of voltage at the midpoint thereof. This result is obtained in practical forms of the antenna when the far end of the transmission line is terminated in an input impedance which corresponds practically to an open circuited transmission line, and with the near end terminated in an impedance equal to the natural impedance of the line. As pointed out, to obtain that result the length of the transmission line may be any odd number of quarter wave lengths, and to obtain efficient radiation from the antenna its dimension should be exactly equal to a half wave length.

In the operation of the arrangement shown oscillations created by 14 will be impressed by the loop 15 upon the transmission circuit 6—10, and the voltage created therein will be impressed at the point X upon the antenna. By virtue of the relative dimensions stated, the voltage impressed upon the antenna by the transmission circuit at the point X will be the maximum voltage, and the wave set up in the antenna will be such that the node will occur at the midpoint of the antenna where the thermocouple is located. The ultra high frequency current flowing in the antenna will produce an equivalent direct current voltage by virtue of the heating effect produced in the thermocouple. This direct voltage will produce a current which will be transmitted over the leads 7 to the meter 8 and will indicate to the attendant at the station the magnitude of the current at the midpoint of the antenna.

The arrangement shown in Fig. 2 differs from that in Fig. 1 only in the mode of support of the direct current leads. In Fig. 2 they are twisted around the lower portion of the conductor that constitutes a part of the antenna and also a part of the transmission circuit.

Since an antenna of the form shown in Figs. 1 and 2 will radiate efficiently only when excited to the resonant frequency for which it is proportioned it is necessary, in order to be able to transmit on a plurality of different wave lengths, to employ antennæ of different lengths. On the other hand, since the oscillator at a station may be readily adjusted to produce any of a plurality of frequencies, it is desirable to use the same terminating circuit for each of the antennæ. The manner in which this may be accomplished is shown in Fig. 5, wherein 20, 21 and 22 represent antennæ, each of which differs in length and is intended to transmit a wave length differing from the others. The antenna 20 is connected at the point 25 with the conductor 26, which forms a part of one side of the transmission circuit. 27 forms part of the other side. These conductors are terminated in jacks 28 and 29 with which the plugs 30 and 31 are intended to operate. These plugs are connected by cords with the loop 23, which is inductively coupled with the loop 32 of the oscillator 33. In like manner, the conductors 34 and 35 connected with antenna 21 are terminated upon the jacks 36 and 37, and similarly, the conductors connected with antenna 22 are connected with jacks. All of these jacks are intended to cooperate with the plugs 30 and 31 so that oscillations from the source 33 may be applied to any of the antennæ by simply plugging the terminal circuit into the jacks of the desired antenna. The length of the portion of the conductors of the transmission circuit extending from the jacks toward the antennæ is such that when added to the length of the conductors of the terminal circuit 24 it renders the length of the entire transmission circuit equal to an odd quarter of the wave length desired to be transmitted over a particular antenna.

Fig. 6 shows that the invention may be employed in a system employing a horizontal antenna. In this case the transmission circuit is vertical and equal to an odd quarter of the wave length. In such an antenna the current may be measured by a thermocouple, as in the other forms shown, and the leads may be brought down to the measuring instrument either through a copper tube, as in Fig. 1, or by spiralling around the conductor, as shown in Fig. 2.

While the invention has been disclosed as embodied in particular forms, it is capable of embodiment in other and different forms without departing from the spirit and scope of the appended claims.

What is claimed is:

1. In a short-wave radio signaling system the combination with a transmission circuit, of a radiating member connected therewith, a translating device connected with the midpoint of the said radiating member to convert alternating current into equivalent direct current potentials, a meter and means to connect the said meter to the said translating device, the said connecting means being enclosed in a metallic tube constituting a part of the said transmission circuit and part of the said radiating member.

2. In a short-wave radio signaling system the combination with a plurality of antenna systems each including a radiating member connected with a portion of a transmission circuit, of a loop having conductors for interchangeable connection with each of the transmission circuits, the length of the said loop being such that when added to that portion of each transmission circuit connected with the said radiating members makes the total length of the circuit thus created equal to an odd quarter of the wave length upon which the antenna connected therewith is intended to operate.

3. In a short-wave radio signaling system, the combination with a transmission circuit, of a radiating member connected therewith, a translating device connected with the midpoint of the said radiating member to convert alternating current into equivalent direct current potentials, a meter and means to connect the said meter to the said translating device, the said connecting means being effectively supported partly by the said transmission circuit and partly by the said radiating member.

4. In a radio signaling system, the combination with a source of oscillations of an antenna located at a considerable distance from the said source, a transmission circuit connecting the said source to the said antenna, a rectifying device connected to the said antenna to convert a portion of the alternating current into the equivalent direct current potential, a current measuring device associated with the said source of oscillations, and a circuit connecting the said current indicating device to the said rectifying device whereby the magnitude of the current in the said antenna may be indicated to an operator at the said source of oscillations.

In testimony whereof, I have signed my name to this specification this 23rd day of May 1927.

DE LOSS K. MARTIN.